(12) United States Patent
Major

(10) Patent No.: US 9,917,488 B2
(45) Date of Patent: Mar. 13, 2018

(54) MOTOR INCLUDING REMOVABLE WEIGHTS FOR BALANCING

(71) Applicant: Nidec Motor Corporation, St. Louis, MO (US)

(72) Inventor: Michael W. Major, Moro, IL (US)

(73) Assignee: Nidec Motor Corporation, St. Louis, MO (US)

( * ) Notice: Subject to any disclaimer, the term of this patent is extended or adjusted under 35 U.S.C. 154(b) by 302 days.

(21) Appl. No.: 14/638,492

(22) Filed: Mar. 4, 2015

(65) Prior Publication Data

US 2015/0256047 A1  Sep. 10, 2015

Related U.S. Application Data

(60) Provisional application No. 61/947,814, filed on Mar. 4, 2014.

(51) Int. Cl.
*H02K 7/04* (2006.01)
*H02K 15/16* (2006.01)
*H02K 7/14* (2006.01)

(52) U.S. Cl.
CPC ............... *H02K 7/04* (2013.01); *H02K 7/14* (2013.01); *H02K 2213/03* (2013.01); *Y10T 29/49009* (2015.01); *Y10T 29/49012* (2015.01)

(58) Field of Classification Search
CPC ........ H02K 7/04; H02K 15/16; H02K 15/165; F02D 29/662
USPC .......... 310/51, 261.1, 272; 73/458; 416/144, 416/145
See application file for complete search history.

(56) References Cited

U.S. PATENT DOCUMENTS

| | | | | |
|---|---|---|---|---|
| 3,273,419 A | * | 9/1966 | Kollmann | F01D 5/027 464/180 |
| 4,363,986 A | * | 12/1982 | Joho | H02K 7/04 310/194 |
| 4,388,756 A | * | 6/1983 | Burns | H02K 7/04 29/416 |
| 4,477,226 A | * | 10/1984 | Carreno | F01D 5/027 416/144 |
| 4,835,827 A | * | 6/1989 | Marra | F01D 5/027 29/407.01 |
| 4,842,485 A | * | 6/1989 | Barber | F01D 5/027 411/104 |
| 4,926,710 A | * | 5/1990 | Novotny | F01D 5/027 29/447 |
| 5,018,943 A | | 5/1991 | Corsmeier et al. | |
| 5,874,796 A | * | 2/1999 | Petersen | H02K 1/146 310/156.37 |
| 6,213,717 B1 | * | 4/2001 | Bucher | F04D 25/088 415/119 |

(Continued)

*Primary Examiner* — Jeremy Luks
(74) *Attorney, Agent, or Firm* — Senniger Powers LLP

(57) ABSTRACT

An electric motor includes a stator, a rotor, and weights removably attached to the rotor shell for use in balancing the rotor. The removable weights may be integrally formed with a rotor shell such that the weights and the rotor shell form a unitary, one-piece construction. The removable weights may be substantially uniformly spaced apart around an entirety of the outer perimeter of the rotor shell. In a method of making an electric motor, the stator is coupled to the rotor such that the weights are accessible for selective removal during balancing of the rotor.

18 Claims, 15 Drawing Sheets

(56) References Cited

U.S. PATENT DOCUMENTS

| | | | |
|---|---|---|---|
| 6,302,650 B1* | 10/2001 | Williams | B29C 45/2708 |
| | | | 416/144 |
| 6,358,009 B1* | 3/2002 | Link | F04D 29/662 |
| | | | 416/145 |
| 7,025,570 B2* | 4/2006 | Jung | F04D 29/164 |
| | | | 416/144 |
| 7,500,831 B2 | 3/2009 | Pearce | |
| 7,841,832 B2* | 11/2010 | Kitamura | F04D 29/662 |
| | | | 416/144 |
| 8,177,487 B2* | 5/2012 | Koza | F01D 5/027 |
| | | | 415/119 |
| 8,328,519 B2 | 12/2012 | Denis et al. | |
| 8,353,670 B2* | 1/2013 | Glasspoole | F01D 5/027 |
| | | | 416/144 |
| 8,631,578 B2* | 1/2014 | Glasspoole | F01D 5/027 |
| | | | 29/889 |
| 8,784,058 B2* | 7/2014 | Schneider | F04D 29/662 |
| | | | 416/144 |
| 8,974,185 B2 | 3/2015 | Franks | |
| 2005/0235686 A1* | 10/2005 | Bin-Nun | F25B 1/02 |
| | | | 62/505 |
| 2005/0249596 A1* | 11/2005 | Hsieh | F04D 29/662 |
| | | | 416/144 |
| 2007/0028716 A1 | 2/2007 | Kawai et al. | |
| 2009/0001825 A1* | 1/2009 | Hanaoka | H02K 15/03 |
| | | | 310/419 |
| 2011/0044816 A1* | 2/2011 | Lecuyer | F01D 5/027 |
| | | | 416/144 |
| 2011/0074240 A1* | 3/2011 | Hiramatsu | H02K 15/0012 |
| | | | 310/211 |
| 2012/0121410 A1* | 5/2012 | Liu | F04D 29/329 |
| | | | 415/220 |
| 2012/0219419 A1* | 8/2012 | Liu | F04D 29/662 |
| | | | 416/144 |
| 2014/0091649 A1* | 4/2014 | Dragon | H02K 1/2766 |
| | | | 310/51 |
| 2014/0363296 A1* | 12/2014 | Yeh | F04D 25/064 |
| | | | 416/144 |
| 2016/0102680 A1* | 4/2016 | Huang | F04D 25/0613 |
| | | | 416/144 |
| 2016/0123150 A1* | 5/2016 | Stone | F01D 5/027 |
| | | | 416/144 |

\* cited by examiner

MOTOR INCLUDING REMOVABLE WEIGHTS FOR BALANCING

FIELD OF THE DISCLOSURE

The present disclosure generally relates to a motor including removable weights for balancing a rotor of the motor.

BACKGROUND OF THE DISCLOSURE

In general, an electric motor includes a rotor, the moving component, and a stator, the stationary component. In one type of electric motor, commonly called an outer-rotor type motor, the rotor surrounds the stator and includes magnets. The stator includes windings carrying electrical current that interacts with the magnetic field of the rotor to generate forces that rotate the rotor about the stator. The outer-rotor type motor is suitable for use in electric fans, blowers, pumps, etc., in which the outer-rotor type motor rotates blades or other fluid-moving components about an axis to produce current or flow within a fluid (e.g., air or liquid). The outer-rotor type motor is also suitable for use in appliances, such as horizontal axis washing machines in which the rotor is used to directly drive the drum of the washing machine. In another type of electric motor, commonly called an inner-rotor type motor, the stator surrounds the rotor. The inner rotor rotates relative to the stator, using the same principles as the outer-rotor type motor. The inner-rotor type motor may also be used in electric fans, blowers, pumps, etc., or other applications.

Typically, the rotor of the motor must be balanced during manufacture and/or assembly to ensure that there is minimum interference (e.g., rubbing) between the rotor and stator, which can lead to vibrations, reduce efficiency due to frictional loses, or cause premature wear of other components (e.g., tub bearings in a washing machine). In one example, clay-like balancing putty may be used to balance the rotor. The balancing putty must adhere to the rotor (e.g., within a pre-formed cavity in the rotor) and remain adhered to the rotor. However, the balancing putty has a tendency to detach from the motor during balancing, or shortly thereafter, if the putty has not yet cured.

SUMMARY OF THE DISCLOSURE

In one aspect, an electric motor generally comprises a stator, and a rotor including a rotor shell. Weights are removably attached to the rotor shell for use in balancing the rotor. The removable weights are integrally formed with the rotor shell such that the weights and the rotor shell form a unitary, one-piece construction.

In another aspect, an electric motor generally comprises a stator, and a rotor including a rotor shell having an outer perimeter. Weights are removably attached to the rotor shell for use in balancing the rotor. The weights are substantially uniformly spaced apart around an entirety of the outer perimeter of the rotor shell.

In yet another aspect, a method of making an electric motor generally comprises providing a stator; providing a rotor including a rotor shell and weights removably attached to the rotor shell for use in balancing the rotor; and operatively coupling, after said providing a stator and said providing a rotor including a rotor shell and weights removably attached to the rotor shell for use in balancing the rotor, the stator to the rotor such that the weights are accessible for selective removal during balancing of the rotor.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

The present disclosure is directed to an electric motor including removable weights attached to a rotor of the motor. For example, the removable weights are integrally formed with a rotor shell and are removable therefrom for use in balancing the rotor. The electric motor may include other features which are disclosed in the following description of exemplary embodiments of the electric motor. Methods of making the electric motor and balancing the rotor of the electric motor are also disclosed. In addition, methods of assembling a product that includes the electric motor and balancing the rotor during assembly of the product are also disclosed.

Figure 1:
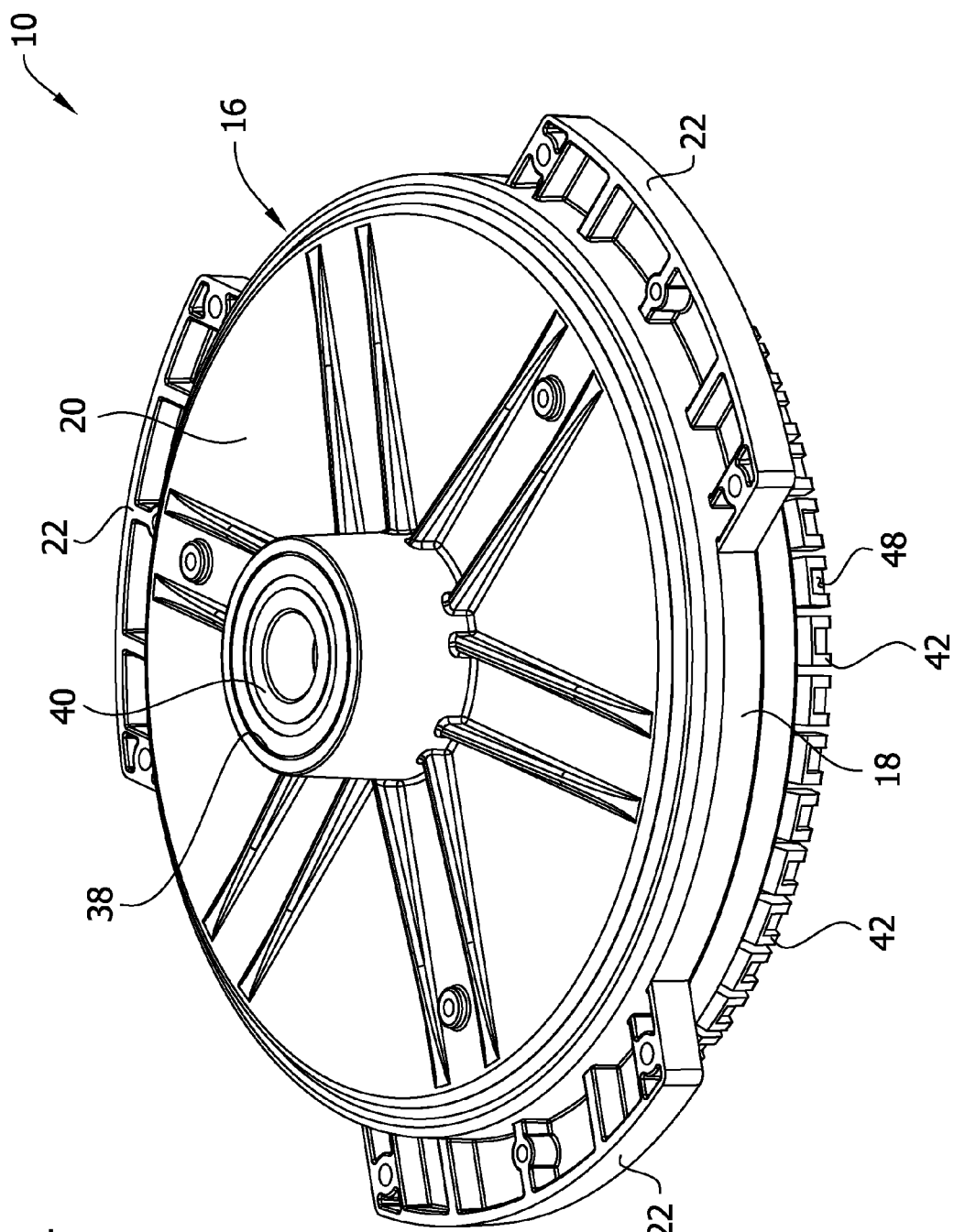
FIG. 1 is a top perspective of a first embodiment of a rotor for an outer-rotor type electric motor.
Figure 2:
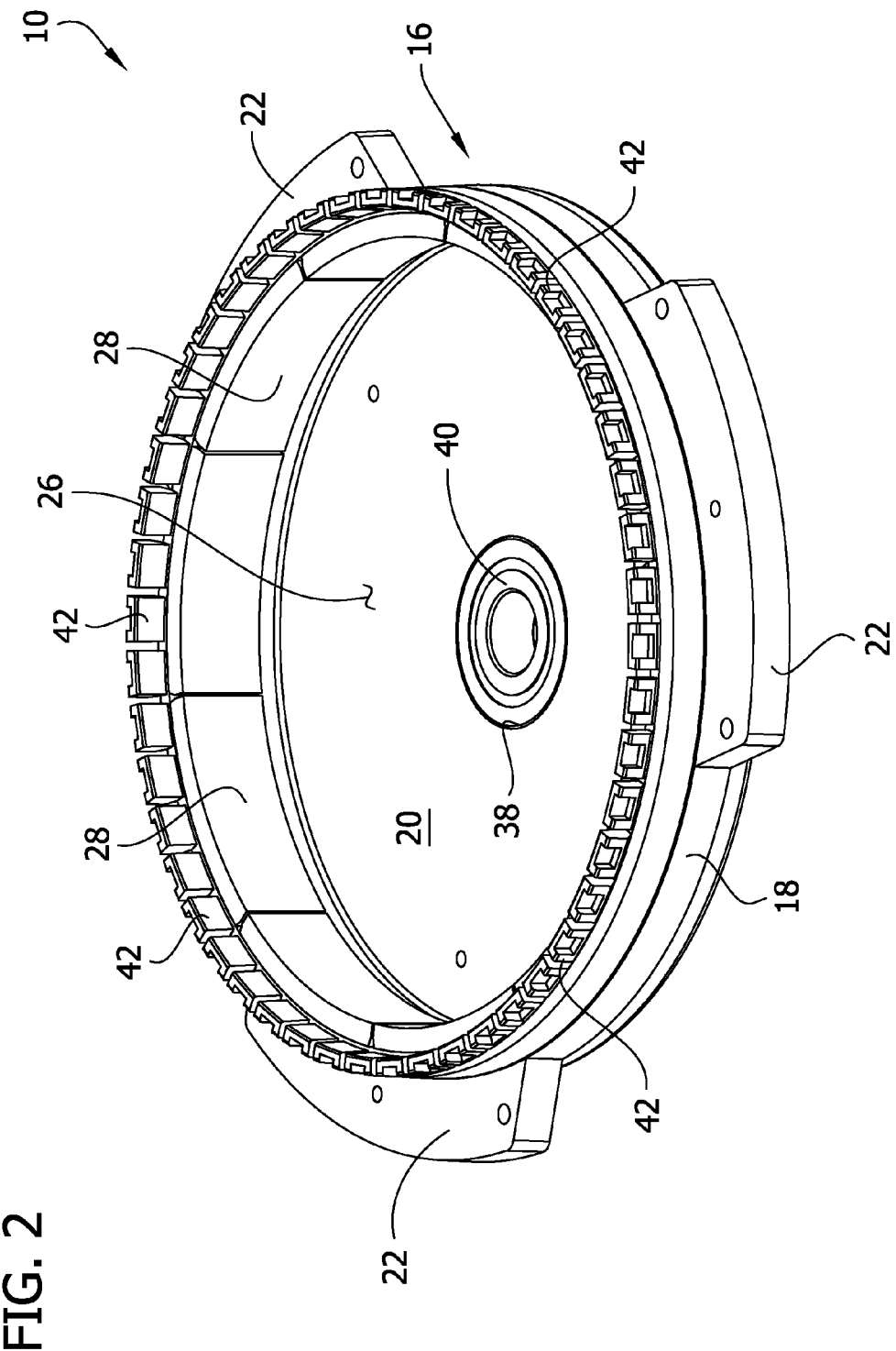
FIG. 2 is a bottom perspective of the rotor.
Figure 3:
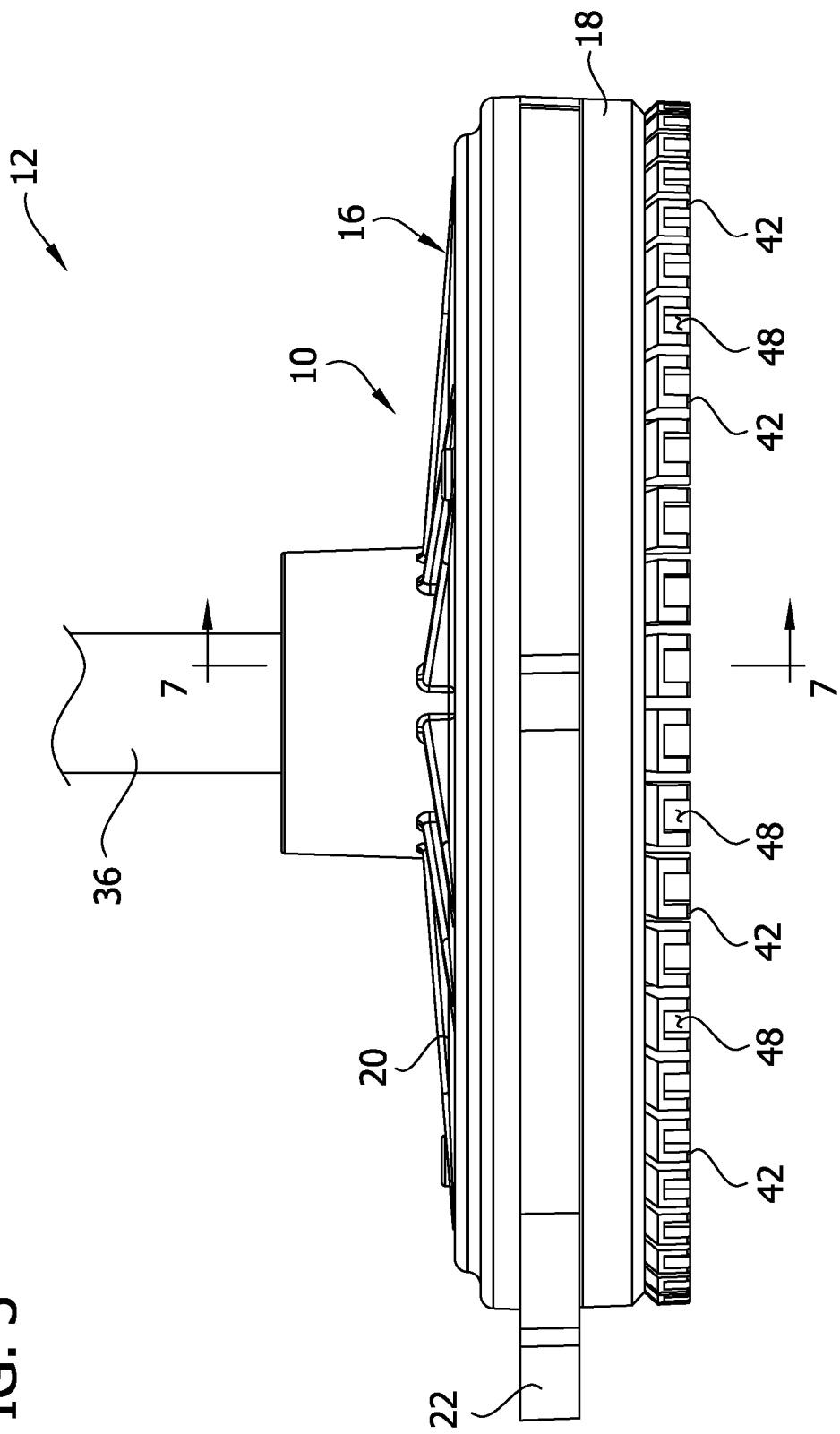
FIG. 3 is a front elevational view of the electric motor including the rotor, a stator shaft, and a stator received in the rotor (the stator being hidden from view)
Figure 4:
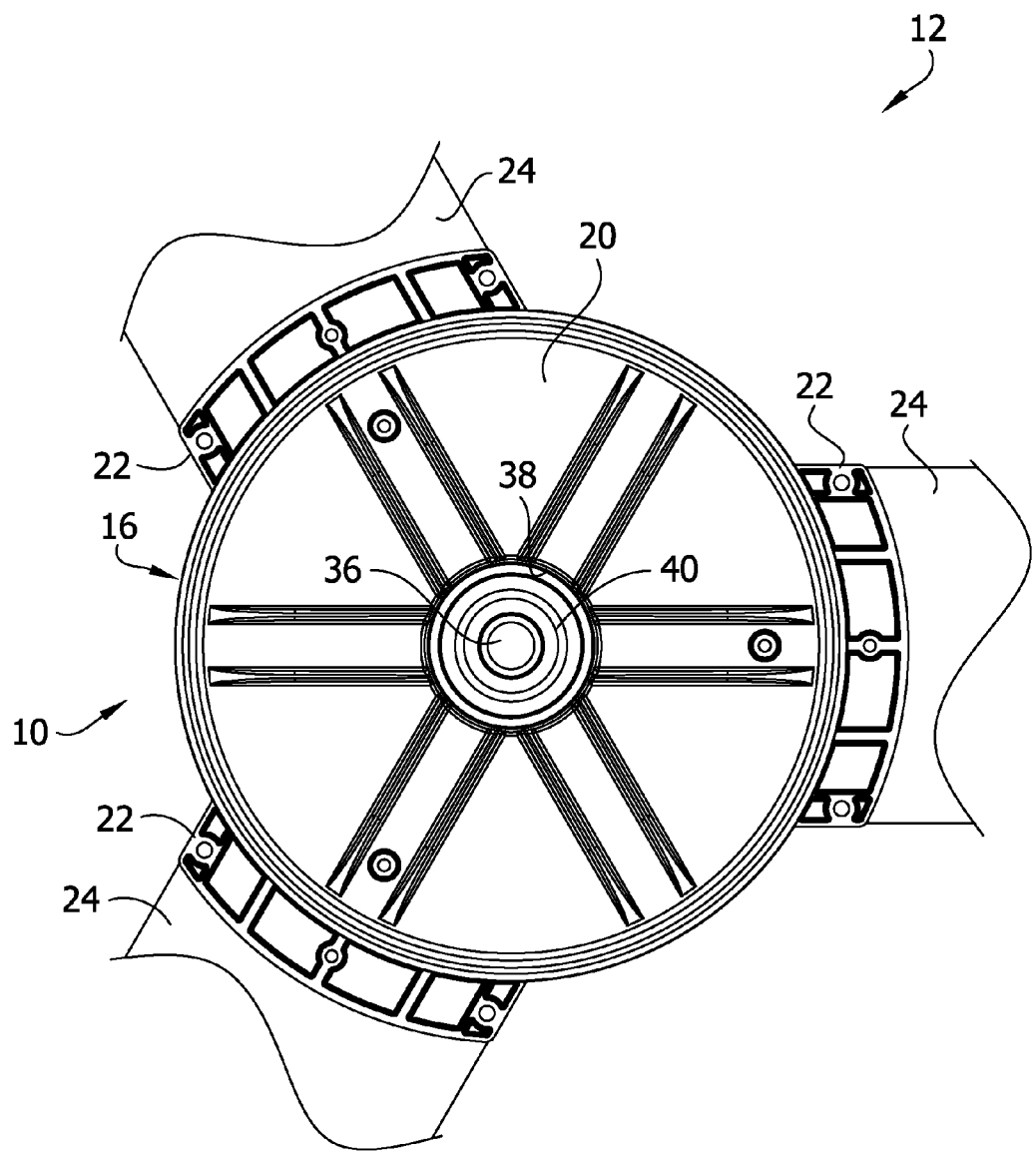
FIG. 4 is a top plan view of the electric motor including fluid-moving components secured to the rotor to form a fan.
Figure 5:
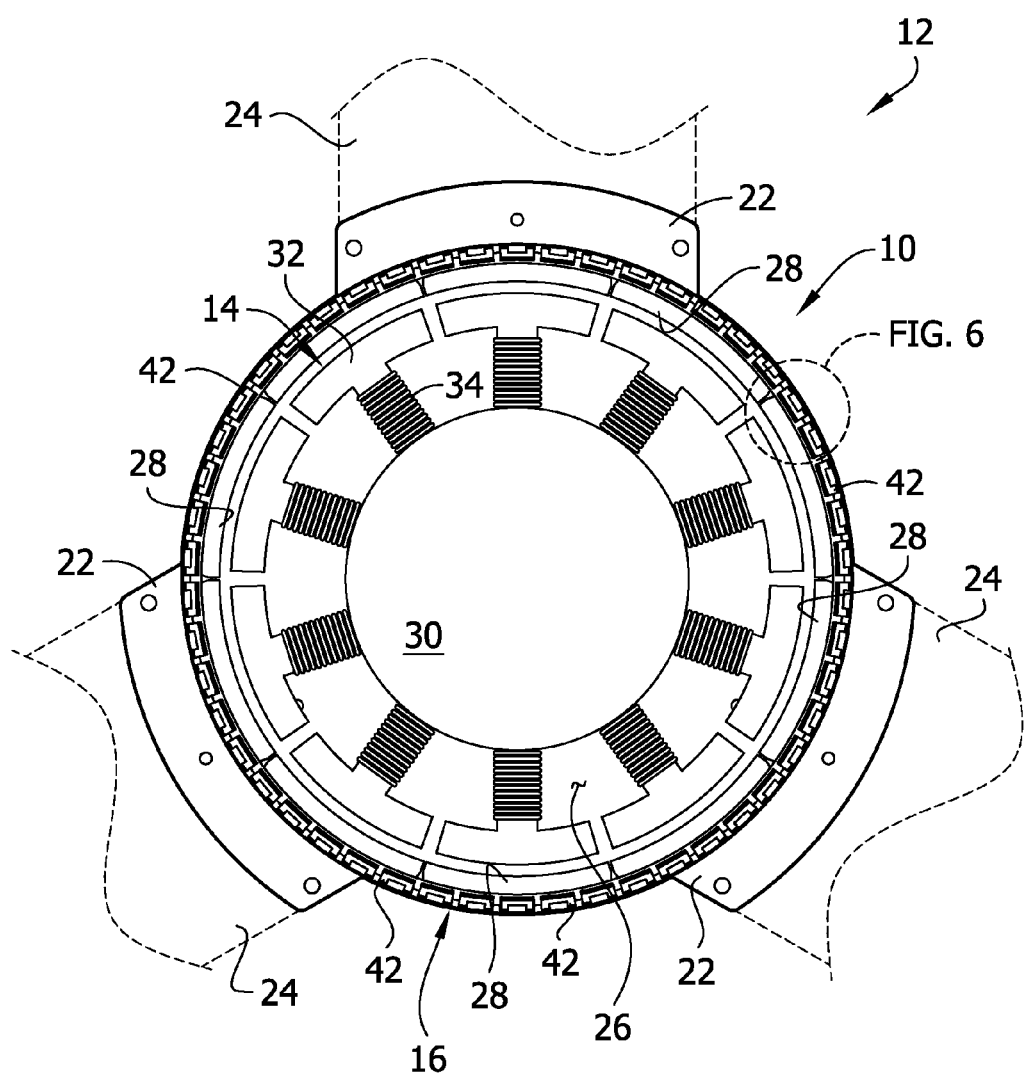
FIG. 5 is a bottom plan view of FIG. 4.
Figure 6:
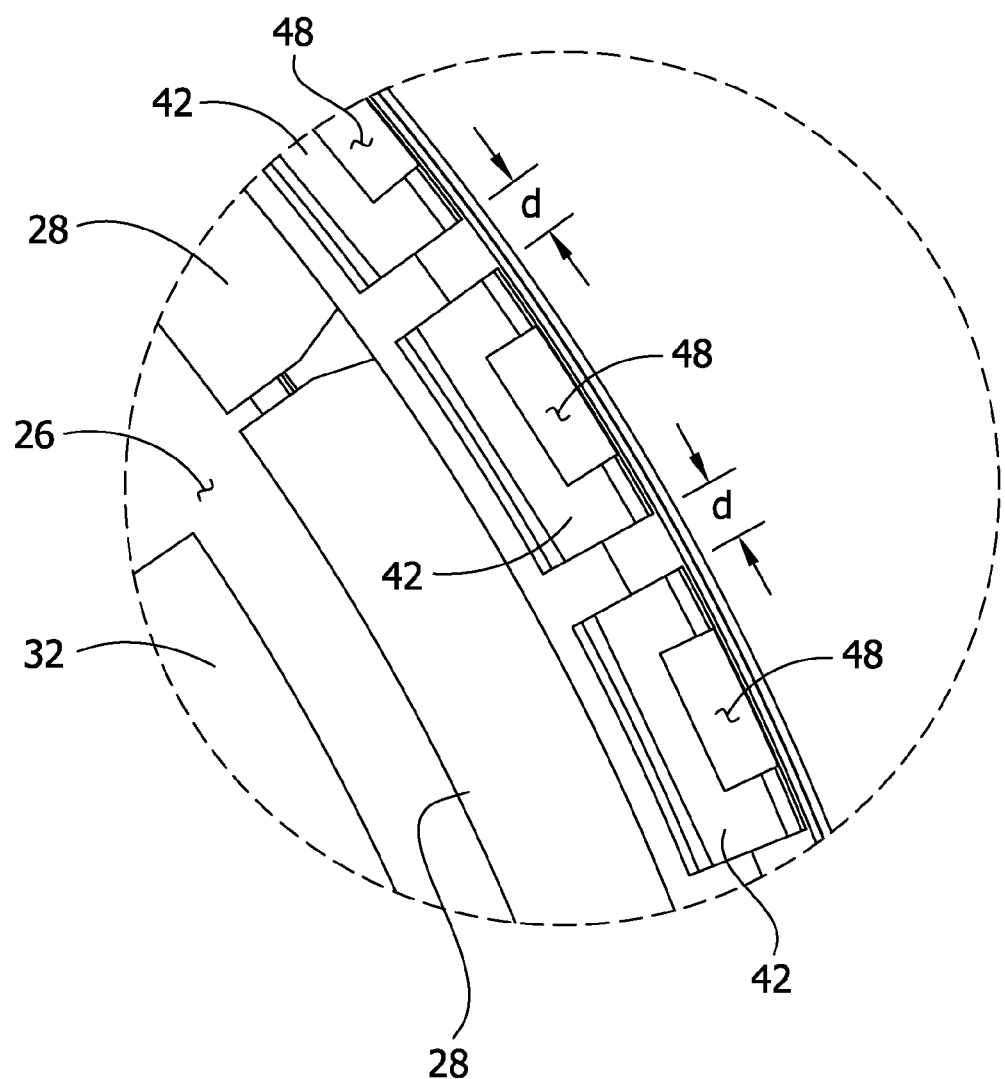
FIG. 6 is an enlarged partial view of FIG. 5.

Referring to FIGS. 1 and 2, a first embodiment of a rotor for an electric motor is generally indicated at reference numeral 10. As shown in FIGS. 3 and 5, the rotor 10 is a component of an electric motor (e.g., an AC electric motor), generally indicated at 12, which also includes a stator, generally indicated at reference numeral 14. In the illustrated embodiment, the rotor 10 is external relative to (i.e., outside) the stator 14. This type of electric motor may be referred to as an outer-rotor type motor. The illustrated rotor 10 includes a rotor shell, generally indicated at 16, having a cylindrical (or annular) rotor sidewall 18 and an upper rotor cover 20 at an upper end of the sidewall. The illustrated rotor shell 16 also includes coupling flanges 22 (e.g., three flanges) extending radially outward from the rotor sidewall 18. As shown in FIGS. 4 and 5, the coupling flanges 22 are used to fixedly secure (e.g., fasten with fasteners, not shown) fluid-moving components 24 (e.g., air foils or blades) to the rotor shell 16. The rotor sidewall 18 and the upper rotor cover 20 define an interior space 26 (FIG. 2) of the rotor shell 16. Although not illustrated, the rotor 10 may include a bottom cover at a lower end of the sidewall 18. Rotor magnets 28 (e.g., permanent magnets, including ferrite and neodymium magnets) are fixedly secured to (e.g., adhered to) and spaced apart around an interior surface of the rotor sidewall 18. The rotor 10 may be of other configurations without departing from the scope of the present invention as defined by the claims. For example, the rotor 10 may be for an inner-rotor type motor.

Figure 7:
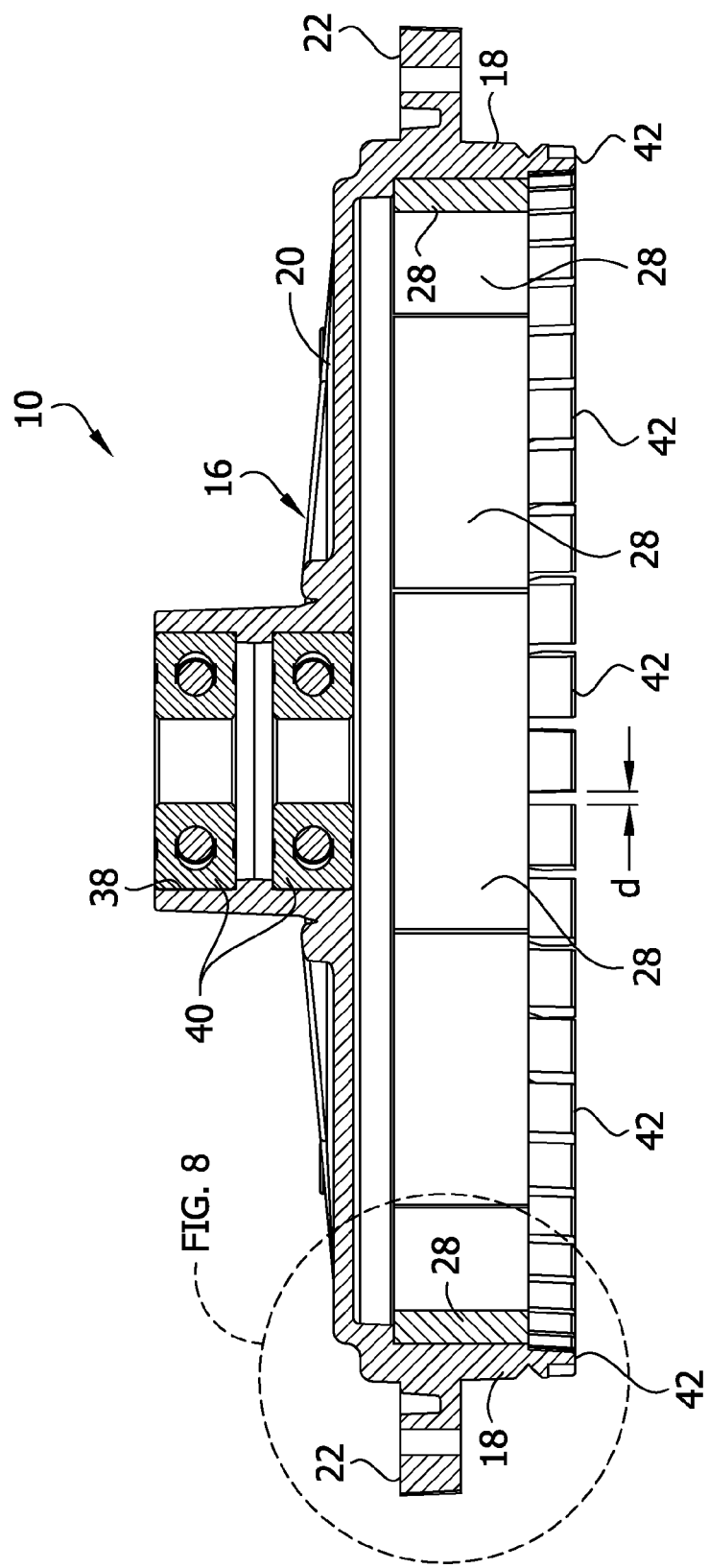
FIG. 7 is a cross section of the rotor taken in the plan defined by the line 7-7 in FIG. 3, the stator and the stator shaft being removed.
Figure 9:
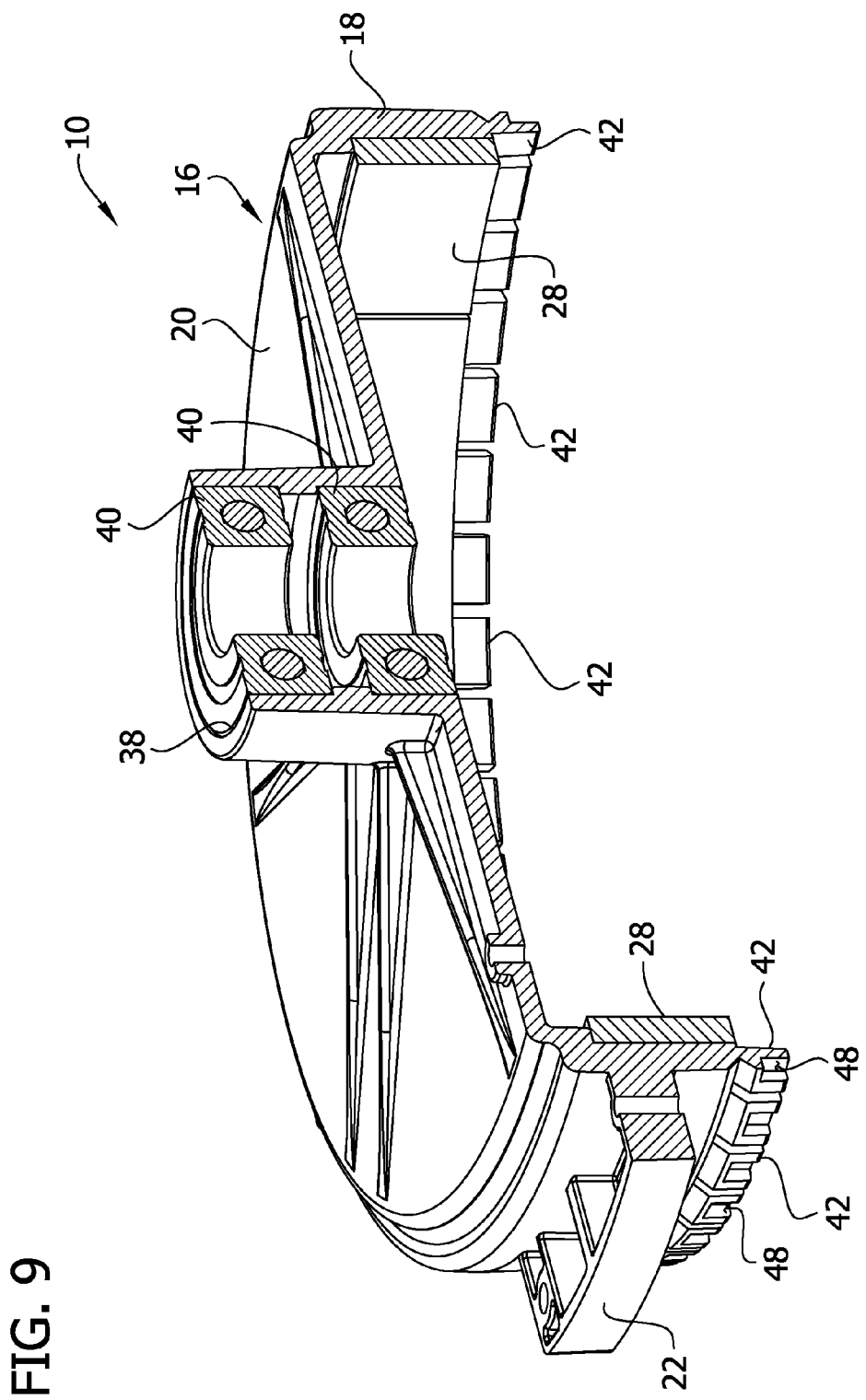
FIG. 9 is a perspective view of the cross section shown in FIG. 7.

Referring to FIG. 5, the illustrated stator 14 includes a stator hub 30, stator teeth 32 extending radially outward from the hub and spaced apart from one another around the hub, and electrically conductive windings 34 wrapped (e.g., coiled) around the stator teeth. The stator 14 is received in the interior space 26 of the rotor shell 16. As shown in FIGS. 3 and 4, a stator shaft 36 fixedly secured to the stator 14 extends through a shaft opening 38 in the upper rotor cover 20. The stator shaft 36 is rotatably coupled to the rotor shell 16 by shaft bearings 40 (see also, FIGS. 7 and 9) secured in the shaft opening 38 to allow for rotation of the rotor 10 about the stator 14 and the stator shaft. The stator 14 and the rotor 10 may have other configurations without departing from the scope of the invention defined by the claims.

As is generally known, in use electric current (e.g., AC current) may be supplied to the windings 34 of the stator 14 to produce a rotating magnetic field. In general, the interaction between the rotating magnetic field produced by the stator windings 34 and the magnetic fields of the rotor magnets 28 produces rotational motion of the rotor 10 about the stator 14. The electric motor 12 may include additional components for operating the motor, such as those components that are conventional and known to those skilled in the art. It is also understood that the electric motor 12 may have other configurations and may be of other types without departing from the scope of the present invention defined by the claims.

As shown throughout the drawings, weights 42 are removably attached to the rotor shell 16 for use in balancing the rotor 10. In one example, the weights 42 are integrally formed with the rotor shell 16 such that the weights and the shell are a unitary, one-piece construction. For example, the rotor shell 16 and the weights 42 may be simultaneously diecasted in a single die to form the unitary, one-piece construction. In such an example, the rotor shell 16 and the weights 42 may be formed from aluminum or other metal. In another example, the rotor shell 16 and the weights 42 may be simultaneously molded in a single mold to form the unitary, one-piece construction. In such an example, the rotor shell 16 and the weights 42 may be formed from a rigid polymer. The weights 42 may be integrally formed with the rotor shell 16 in other ways, including but not limited to welding, soldering, brazing, or overmolding the weights to the rotor shell such that the weights are attached to the rotor shell before balancing the rotor 10. The weights 42 and the rotor shell 16 may be made of the same or different materials.

Figure 8:
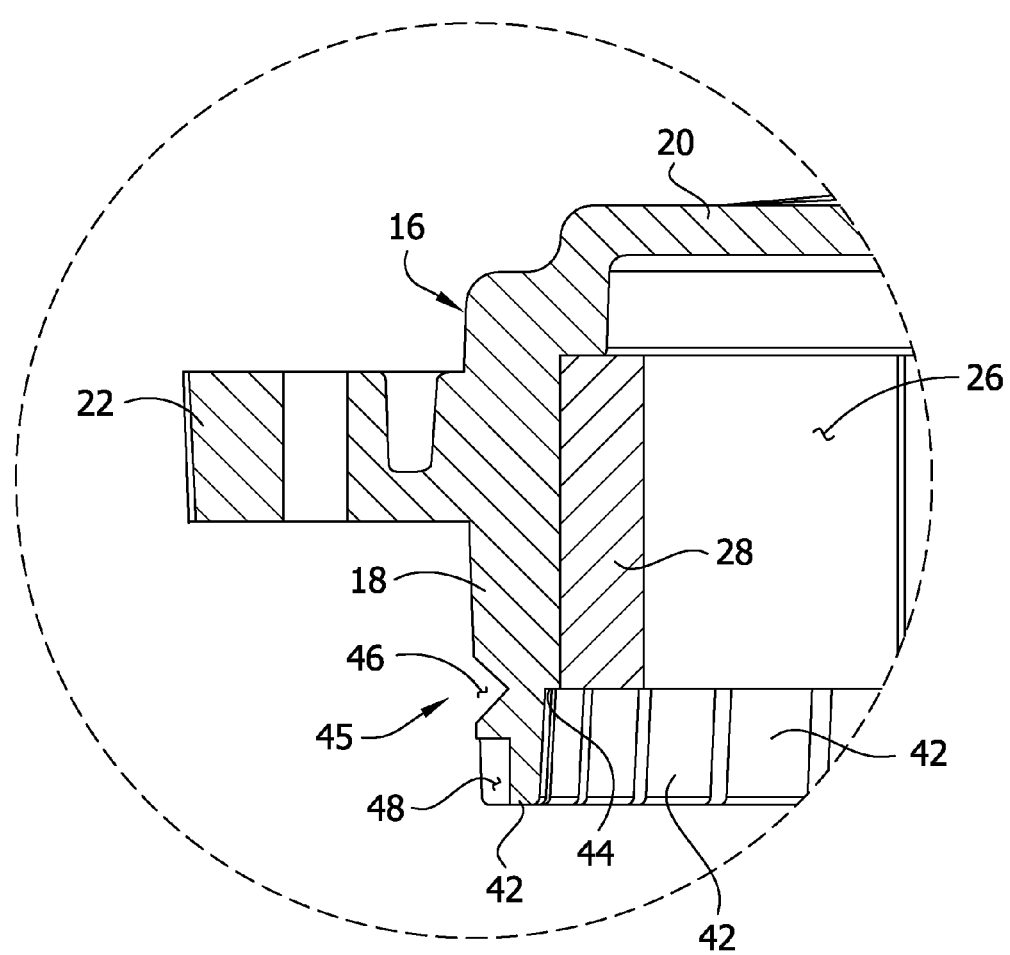
FIG. 8 is an enlarged partial view of FIG. 7.

In the illustrated embodiment shown in FIGS. 1-9, the weights 42 are formed as removable tabs attached to a lower rim 44 (FIG. 8) at the lower end of the rotor sidewall 18. As explained below, one or more of the weights 42 (or possibly none of the weights if the rotor 10 is balanced within a desired specification as manufactured) are removed to facilitate balancing of the rotor. The weights 42 may be substantially uniformly or non-uniformly spaced apart from one another and may extend around at least a portion of an outer perimeter of the rotor shell 16. In the illustrated embodiment, the weights 42 are uniformly spaced apart from one another a distance d (FIGS. 6 and 7) and extend around an entirety of the lower rim 44 of the rotor shell 16. In particular, the weights 42 are substantially uniformly spaced the distance d and extend around an entire 360 degrees of a perimeter of the rotor shell 16. The distance d may measure, in angular degrees relative to a center axis of the rotor shell 16, from about 2° to about 10°, and in one example, about 5°, although the distance may be any suitable amount. The weights 42 extend downward from the lower rim 44 although the weights may extend in any suitable direction. As shown in FIG. 8, the weights 42 are attached to the rotor shell 16 at junctures that include areas of weakness, generally indicated at reference numeral 45, to facilitate breaking of the weight 42 from the rotor shell. In the illustrated embodiment, the areas of weakness 45 include notches 46 defined by thinned or beveled portions of the weights 42 and the rotor sidewall 18. Each notch 46 defines a line of weakness, extending generally transverse to the length of the corresponding weight 42, along which the weight fractures from the shell 16 when a suitable force (e.g., a rotational force in an upward direction) is applied thereto. The areas of weakness 45, including the notches 46, may be formed during formation of the rotor shell 16 and the weights 42, such as during die-casting or molding. In another example, the areas of weakness 45, including the notches 46, may be formed after formation of the rotor shell 16 and the weights 42, such as by removing (e.g., cutting or grinding) material from one or both of the rotor shell 16 and the weights 42.

In the illustrated embodiment, each weight 42 has a tool recess 48 on an outer surface extending from a free end toward an attached end of the weight. The tool recess 48 is sized and shaped to receive a working component of a removable tool (e.g., a jaw of needle nose pliers (not shown)). Accordingly, the tool recess 48 facilitates positioning of the working component of the tool (e.g., the jaws of needle nose pliers) relative to a selected weight 42 so that the selected weight can be removed (e.g., broken off) from the rotor shell 16 using the tool during balancing. Once a weight 42 is removed from the rotor shell 16, it is generally not reattachable to the shell. That is, the weight 42 is not configured for re-attachment or resecurement to the rotor shell 16 once it has been removed from the rotor shell, although the weight may be reattached using adhesive or in other ways, if desired.

In the illustrated embodiment, the weights 42 are of uniform (i.e., substantially the same) mass, although the weights may have different masses. For example, one set of weights 42 may have a first mass, while a second set of weights may have a second mass that is greater than the first mass. In one example, the weights 42 that are diametrically opposite one another relative to the rotor shell 16 have the same mass. In one example, each weight 42 may have a predetermined mass from about 0.1 g to about 10.0 g, or from about 0.5 g to about 10.0 g, and in one example, about 0.5 g. Each weight 42 may be of any suitable, predetermined mass. The predetermined mass of each weight 42 may be based on desired balancing specifications. For example, where the desired balancing specifications call for balancing the rotor 10 within a certain mass, each weight 42 may have a mass matching the certain mass. That is, for example, where the desired balancing specifications call for balancing within 0.5 g, each weight 42 may be 0.5 g. The predetermined mass of each weight 42 may be based on other criteria without departing from the scope of the present invention defined by the claims.

According to one embodiment, a method of making the electric motor 12 includes forming the rotor shell 16 and the weights 42 such that the rotor shell and the weights are integrally formed as a one-piece construction. For example, the rotor shell 16 and the weights 42 may be formed simultaneously, such as by die casting or molding or in other ways. In another example, the rotor shell 16 may be formed separately from the weights 42, and the weights are attached to the rotor shell by welding, soldering, brazing, overmolding, or in other ways. After providing the integrally formed rotor shell 16 and weights 42, the rotor magnets 28 (e.g., permanent magnets) may be attached, such as by adhesive, to the interior surface of the rotor shell sidewall 18. (As used herein, the term "providing" broadly includes one or both of forming (e.g., manufacturing) the element/component being provided and having possession of the element/component being provided.) The stator 14 is then secured inside the rotor shell 16 (e.g., the stator shaft 36 is secured to shaft bearings 40) such that the rotor shell is rotatable about the stator. Additional components may be attached to the stator 14 and/or the rotor 10 to form a substantially completed electric motor 12. In one embodiment, the electric motor 12, including the weights 42 removably attached to the rotor 10, is formed before completing assembly of a product (e.g., a ceiling fan or other device for moving fluid) that will include the electric motor. For example, the electric motor 12 may be sold and shipped to a manufacturer of a retail product. The manufacturer may assemble the retail product (e.g., a ceiling fan or other fluid moving product) that includes the electric motor 12. In such an embodiment, the electric motor 12 that is sold to the manufacturer may include all of the weights 42 (i.e., none of the weights are removed), and as explained below, the manufacturer removes one or more (or none) of the weights to balance the rotor 10.

According to one embodiment, a method of balancing a rotor of an electric motor includes providing the electric motor, such as the electric motor 12 shown and described with respect to FIGS. 1-9, including the integrally formed rotor shell 16 and removable weights 42, and the stator 14. After providing the electric motor 12, the imbalance of the rotor 10 is measured, such as by using a balancing machine (not shown). The balancing machine may be capable of determining the angular position of the weight imbalance. Balancing machines for balancing the rotor of an electric motor are generally known in the art, and therefore, will not be described herein. Using the results provided by the balancing machine, one or more of the weights 42 at one or more selected positions on the rotor shell 16 are removed to balance the rotor 10 within a desired specification. In conventional balancing methods, one or more weights would be added to a selected angular position(s) of the rotor shell, as indicated by the balancing machine. In contrast, in the present embodiment one or more weights 42 are removed from the rotor shell 16 at selected angular position(s). For example, as described above, one or more weights 42 may be broken off from the rotor shell 16, such as by using needle nose pliers (or another working tool) to grasp and apply a force to the selected weight(s) to break off the selected weight(s) at the corresponding line of weakness.

In an embodiment where the retail product including the electric motor 12 is a fluid mover (e.g., a ceiling fan, blower, pump, etc.) including fluid-moving components 24 (e.g., air foils or blades), the rotor 10 of the motor may be balanced before and/or after attaching the fluid-moving components to the rotor shell 16. For example, the rotor 10 may be balanced only after the fluid-moving components 24 are attached to the rotor shell 16. The weights 42 remain accessible for removal after the fluid-moving components 24 are attached to the rotor shell 16. In another example, the rotor 10 may be balanced in a first step before the fluid-moving components 24 are attached to the rotor shell 16 and in a second step after the fluid-moving components are attached to the rotor shell.

Figure 10:
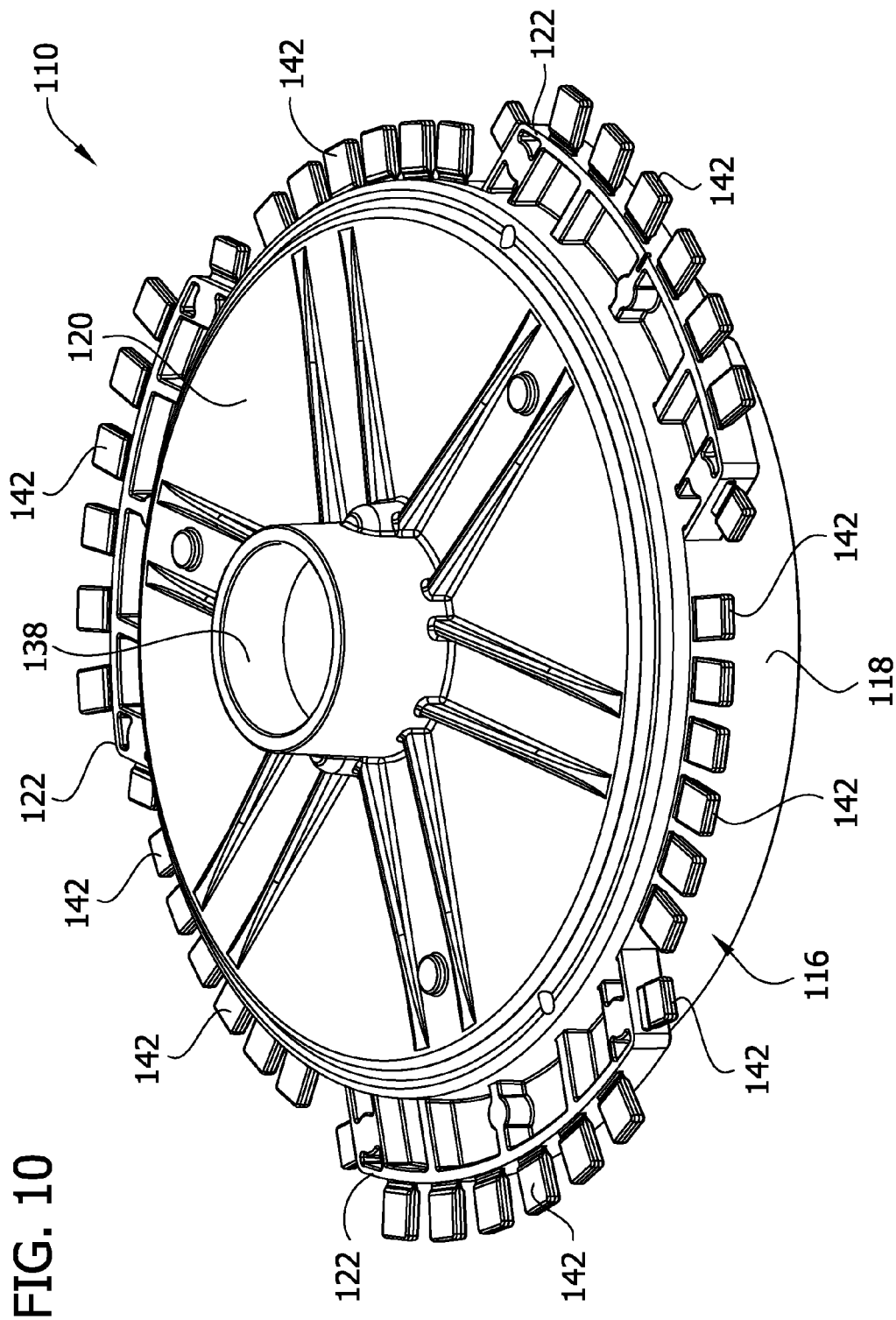
FIG. 10 is a top perspective of a second embodiment of a rotor for an outer-rotor type electric motor.
Figure 11:
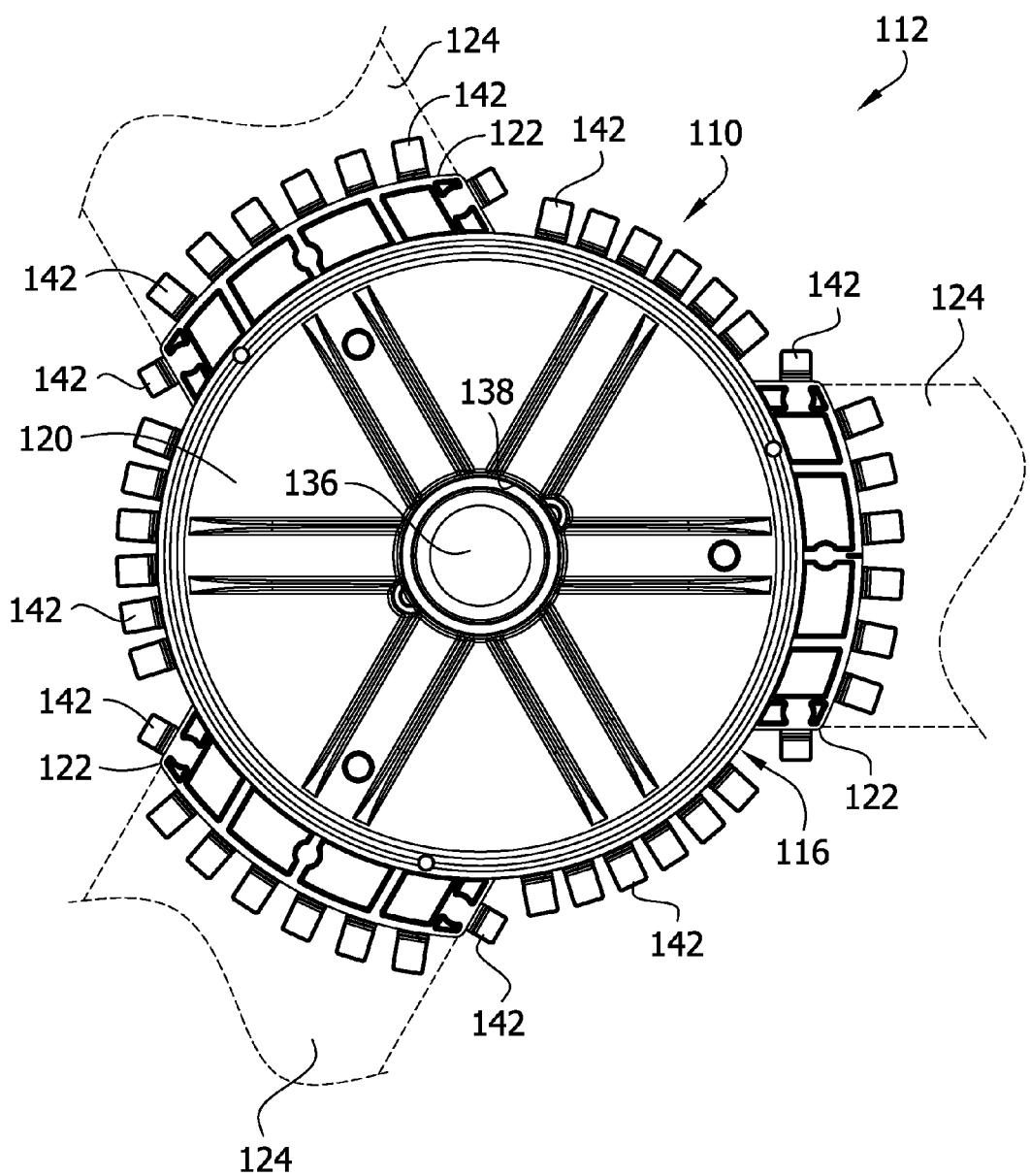
FIG. 11 is a top plan view of the second embodiment of the rotor.
Figure 12:
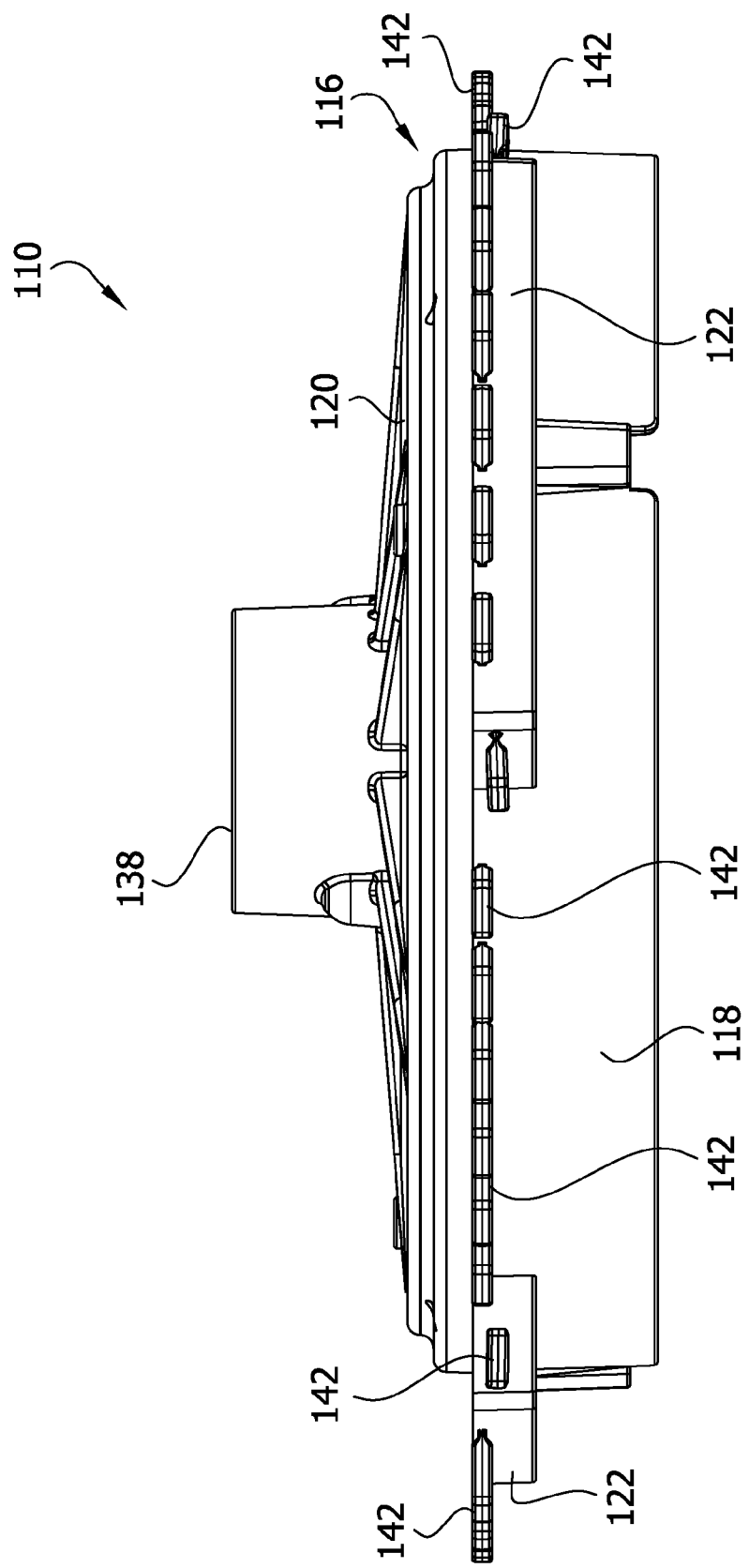
FIG. 12 is a front elevational view of the second embodiment of the rotor.

Referring to FIGS. 10-12, another embodiment of a rotor is generally indicated at reference numeral 110. This rotor 110 is similar to the first rotor 10 and is configured for rotational coupling to a stator, such as stator 14, to form an electric motor similar to motor 12. Like the first rotor 10, the rotor 110 includes a rotor shell, generally indicated at 116, having a cylindrical (or annular) rotor sidewall 118 and an upper rotor cover 120 at an upper end of the sidewall. The illustrated rotor shell 116 also includes coupling flanges 122 (e.g., three flanges) extending radially outward from the rotor sidewall 118. The coupling flanges 122 are used to fixedly secure (e.g., fasten) the fluid-moving components 124 (e.g., air foils or blades) to the rotor shell 116. The rotor sidewall 118 and the upper rotor cover 120 define an interior space (not shown) of the rotor shell 116. Rotor magnets (e.g., permanent magnets, including ferrite and neodymium magnets; not shown) are fixedly secured to (e.g., adhered to) and spaced apart around an interior surface of the rotor sidewall 118, similar to the first rotor 10.

Weights 142 are removably attached to the rotor shell 116 for use in balancing the rotor 110. The weights 142 are integrally formed with the rotor shell 116 such that the weights and the shell are a unitary, one-piece construction, as set forth above with respect to the first rotor 10. The weights 142 are uniformly spaced apart from one another (such as by the distance d, as set forth above with respect to the first rotor 10) around an entire 360 degree perimeter of the rotor shell 116. The weights 142 may be attached to the rotor shell 116 at junctures that include areas of weakness to facilitate breaking of the weight 142 from the rotor shell, as taught above with respect to the first rotor. The main difference between the first rotor 10 and the present rotor 110 is that the weights 142 of the present rotor extend laterally (or radially) outward from the rotor sidewall 118 adjacent the upper rotor cover 120. In the illustrated embodiment, the weights 142 are also on the coupling flanges 122, although the weights may extend around the rotor sidewall 118 at other locations so that the weights are not on the coupling flanges. The weights 142 may be at other locations on the rotor shell 116 without departing from the scope of the present invention defined by the claims.

Although the above embodiments pertain to rotors configured for an outer-rotor type motor (e.g., the illustrated motor 12), in other embodiments the rotor and the rotor shell may be configured for an inner-rotor type motor. In other words, a rotor for an inner-rotor type motor may be constructed such that the rotor shell includes removable weights for use in balancing the rotor. The teachings set forth above with respect to the illustrated rotor 10 and rotor shell 16 apply equally to a rotor and rotor shell for an inner-rotor type motor.

Figure 13:
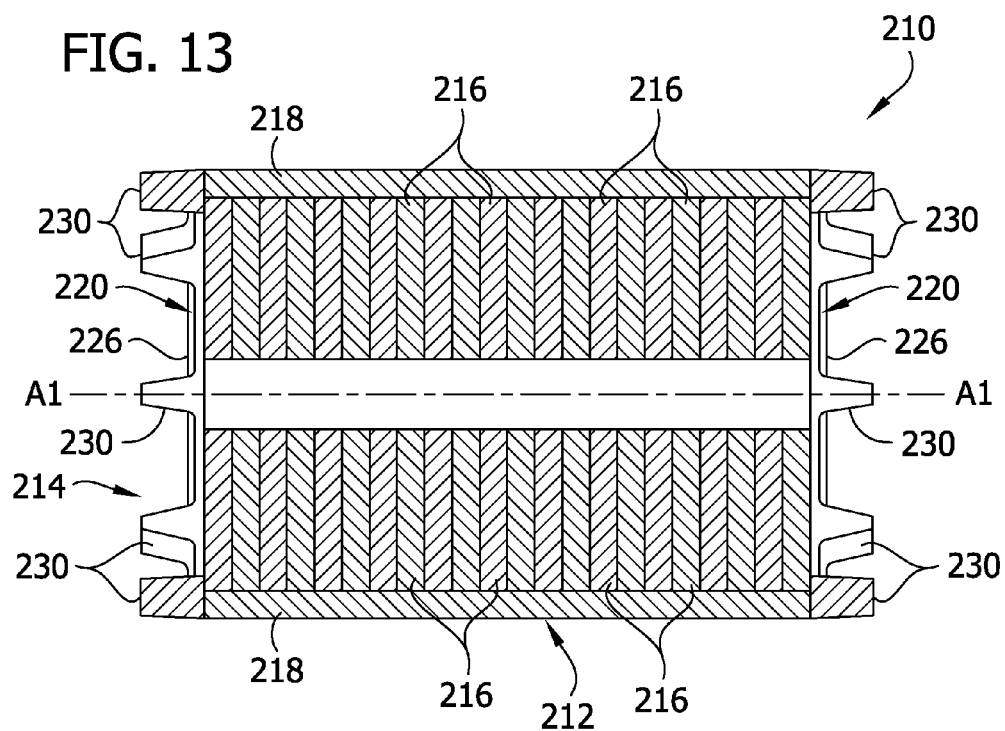
FIG. 13 is a longitudinal section of an embodiment of a rotor for an inner rotor type electric motor, the rotor including opposite end plates and weights on the opposite end plates.
Figure 16:
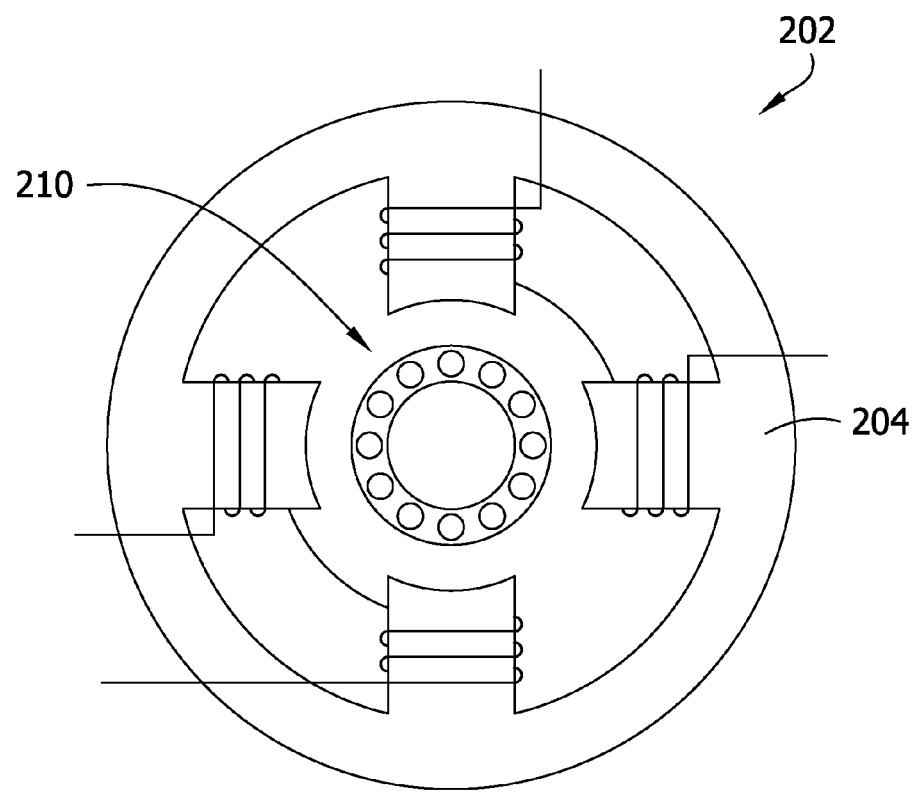
FIG. 16 is a schematic of an inner-rotor type motor including the rotor of FIG. 13.

Referring to FIG. 13, one example of an inner rotor constructed according to the principles of the present disclosure is generally indicated at reference numeral 210. As shown in FIG. 16, the inner rotor 210 is a component of an inner-rotor type motor, generally indicated at 202. The inner-rotor type motor 202 also includes an outer stator 204 operatively coupled to the inner rotor 210 in a suitable manner. Referring back to FIG. 13, when assembled with the outer stator 204, the rotor 210 is rotatable about its axis A1. A shaft (not shown), or other output component for transferring motion from the inner rotor 210, may be attached to and generally aligned with the axis A1. The illustrated inner rotor 210 includes an inner core, generally indicated at 212, disposed within a rotor shell, generally indicated at 214. The inner core 212, in this example, includes a laminated stack of a metal discs 216, and a plurality of electrically conductive bars 218 embedded in the laminated discs and extending along the inner rotor 210. The metal discs 216 may comprise a soft iron or other material. The electrically conductive bars 218 may comprise copper or aluminum or other suitable electrically conductive material. The inner core 212 may be constructed in other ways without departing from the scope of the present invention.

Figure 14:
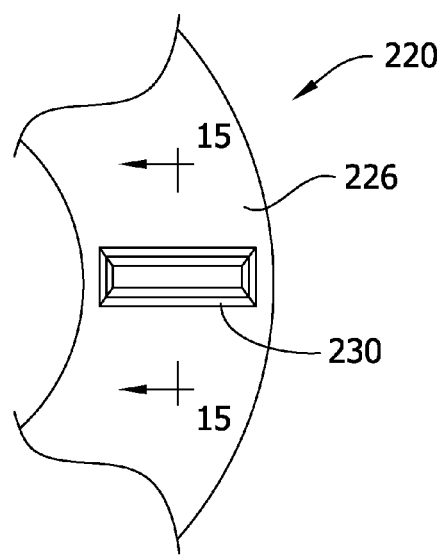
FIG. 14 is an enlarged, fragmentary side elevation of the rotor of FIG. 13 illustrating a single weight.

Referring to FIGS. 13 and 14, the rotor shell 214 includes a pair of end caps, each generally indicated at 220, at opposite longitudinal ends of the rotor 210. Each end cap 220 includes an end plate 226 and weights 230 extending generally axial outward from the plate. The illustrated end plates 226 have a generally annular shape, although the plates may have other shapes. The end plates 226 are connected to the electrically conductive bars 218 such that the electrically connected bars extend between and interconnect the plates. For each of the end caps 220, the weights 230 are spaced apart around the corresponding end plate 226 (and the axis A1). The weights 230 may have a uniform mass or may have different masses. In one embodiment, the weights 230 are integrally formed with the corresponding plate 226. Each plate 226 and the corresponding weights 230 may be formed in a manner similar to that disclosed above with respect to the prior embodiments. Each plate 226 and the corresponding weights 230 may be formed from metal, such as aluminum, or another material. As with the other rotor embodiments, the weights 230 may be accessible, after the rotor 210 is operatively coupled to a suitable outer stator, for selective removal or at least a portion of one or more weights during balancing of the rotor 210.

Figure 15:
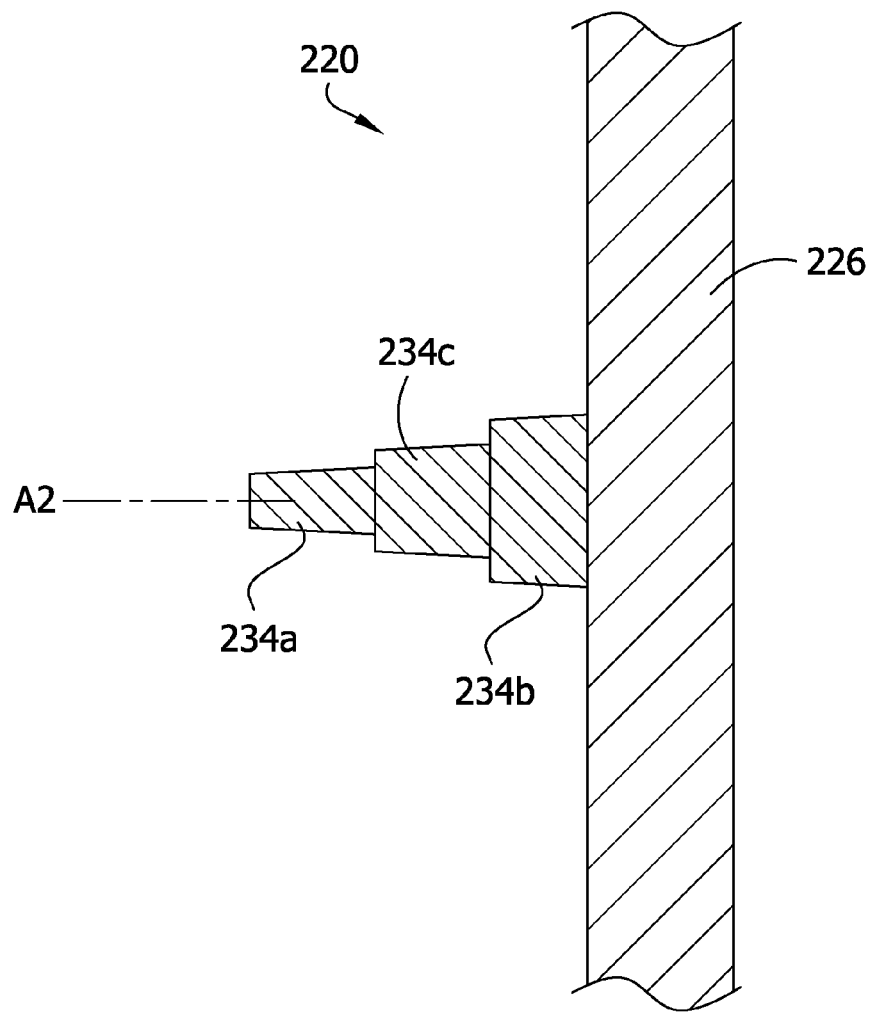
FIG. 15 is a cross section taken in the plane defined by the line 15-15 in FIG. 14.

Referring to FIG. 15, each illustrated weight 230 has an axis A2 extending outward from the corresponding plate 226, and includes one or more axial weight portions stacked along its axis. In the illustrated embodiment, the weight 230 has a first removable axial weight portion 234a at its terminal end, a base axial weight portion 234b connected to the corresponding end plate 226, and a second removable axial weight portion 234c intermediate and interconnecting the first removable axial weight portion and the base axial weight portion. The first and second removable axial weight portions 234a, 234c are selectively removable from the rotor shell 214—thereby forming weights themselves—for use in balancing the rotor 210. The illustrated base axial weight 234b portion is not removable from the rotor shell 214, although in other embodiments it can be. The first removable axial weight portion 234a is removable independent of the second removable axial weight portion 234c via a first break line or area of weakness at the junction of the second removable axial weight portion. Moreover, the second removable axial weight portion 234c is removable, along with the first removable axial weight portion 234a, via a second break line or area of weakness at the junction of the base axial weight portion 234b. In other embodiments, the weight 230 may have any suitable number of removable axial weight portions or an entirety of the weight 230 may be removable from the rotor shell 214.

In the illustrated embodiment, the first and second axial weight portions 234a, 234c, respectively, have different masses to further aid in more precise balancing. For example, the first removable axial weight portion 234a may have a mass that is less than the mass of the second removable axial weight portion 234c. In one example, the mass of the first removable axial weight portion 234a is about 3 grams and the mass of the second removable axial weight portion 234c is about 5 grams. In this example, either 3 grams (i.e., only the first removable axial weight portion 234a) or 8 grams (i.e., the first and second removable axial weight portions, 234a, 234c) can be removed for balancing the rotor 210.

The method of balancing the motor 202 by breaking off selective weights (i.e., removable axial weight portions 234a, 234c) from the rotor shell 210 may be similar to the method set forth above with respect to the previous embodiments. Other teachings of the previous embodiments apply equally to the present motor 202 and rotor 210.

In respective embodiments, methods of making the rotor 110 and rotor 210, making the electric motor including the rotor, assembling the product that includes the electric motor, and balancing the rotor of the assembled product are substantially the same as set forth above with respect to the first embodiment.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An electric motor comprising:
    a stator;
    a rotor including a rotor shell having a generally cylindrical sidewall having a longitudinal axis and a lower rim; and
    removable weights removably attached to the lower rim for use in balancing the rotor, wherein the removable weights extend at least partially around the lower rim and each of the removable weights extends at least one of axially relative to the longitudinal axis beyond the lower rim and radially relative to the longitudinal axis beyond the lower rim, wherein the removable weights are integrally formed with the rotor shell such that the removable weights and the rotor shell form a unitary, one-piece construction,
    wherein each of the removable weights has a free end, an attached end, and a recess which is located on an outer surface extending from the free end and toward the attached end, and wherein the removable weights are configured to be selectively broken off from the rotor shell for use in balancing the rotor.

2. The electric motor set forth in claim 1, wherein the removable weights are spaced apart from one another around an entirety of the lower rim.

3. The electric motor set forth in claim 1, wherein the rotor shell at least partially defines an interior in which the stator is at least partially received.

4. The electric motor set forth in claim 3, wherein the removable weights are substantially uniformly spaced around an entirety of the lower rim of the sidewall of the rotor shell.

5. The electric motor set forth in claim 1, wherein the removable weights have substantially uniform mass.

6. The electric motor set forth in claim 1, wherein each removable weight has a mass of about 0.5 g to about 10.0 g.

7. The electric motor set forth in claim 6, wherein the mass of each removable weight is about 0.5 g.

8. The electric motor set forth in claim 1, wherein each removable weight is configured to be non-reattachable to the rotor shell after the removable weight has been removed therefrom.

9. The electric motor set forth in claim 1, in combination with fluid-moving members extending laterally outward from the rotor shell, wherein the removable weights are accessible for removal from the rotor shell.

10. An electric motor comprising:
a stator;
a rotor including a rotor shell having a longitudinal axis and an outer perimeter; and
removable weights removably attached to the outer perimeter of the rotor shell for use in balancing the rotor, wherein the removable weights are substantially uniformly spaced apart around an entirety of the outer perimeter of the rotor shell and each removable weight extends in a direction at least one of axially relative to the longitudinal axis beyond the outer perimeter and radially relative to the longitudinal axis beyond the outer perimeter,
wherein the removable weights are attached to the rotor shell at respective junctures,
wherein each juncture defines an area of weakness along which the corresponding removable weight is capable of being removed from the rotor shell.

11. The electric motor set forth in claim 10, wherein the removable weights are configured to be selectively broken off from the rotor shell for use in balancing the rotor.

12. The electric motor set forth in claim 10, wherein the rotor shell has a generally cylindrical sidewall having a lower rim and at least partially defining an interior in which the stator is at least partially received, wherein the removable weights are substantially uniformly spaced apart around an entirety of the lower rim of the rotor shell.

13. The electric motor set forth in claim 10, wherein the removable weights have substantially uniform mass.

14. The electric motor set forth in claim 10, wherein each removable weight is configured to be non-reattachable to the rotor shell after the removable weight has been removed therefrom.

15. The electric motor set forth in claim 10, in combination with fluid-moving members extending laterally outward from the rotor shell, wherein the removable weights are accessible for removal from the rotor shell.

16. A method of making an electric motor comprising:
providing a stator
providing a rotor including a rotor shell having a longitudinal axis and a lower rim;
removably attaching weights to the lower rim of the rotor shell, wherein the removable weights extend in a direction at least one of axially relative to the longitudinal axis beyond the lower rim and radially relative to the longitudinal axis beyond the lower rim, each of the removable weights having a free end, an attached end, and a recess which is located on an outer surface extending from the free end and toward the attached end, the removable weights being removable from the lower rim for use in balancing the rotor; and
operatively coupling, after said providing a stator and said providing a rotor, the stator to the rotor such that the removable weights are accessible for selective removal during balancing of the rotor.

17. The method set forth in claim 16, wherein said providing a rotor comprises die casting the rotor shell and the removable weights such that the rotor shell and the removable weights are integrally formed as a unitary, one-piece construction.

18. An electric motor comprising:
a stator;
a rotor including a rotor shell having a generally cylindrical sidewall having a longitudinal axis and a lower rim; and
removable weights removably attached to the lower rim for use in balancing the rotor, wherein the removable weights extend at least partially around the lower rim and each of the removable weights extends at least one of axially relative to the longitudinal axis beyond the lower rim and radially relative to the longitudinal axis beyond the lower rim, wherein the removable weights are integrally formed with the rotor shell such that the removable weights and the rotor shell form a unitary, one-piece construction, the removable weights connected to the rotor shell at respective junctures, wherein each juncture defines an area of weakness, having a notch, along which the corresponding removable weight is capable of being removed from the rotor shell.

* * * * *